Patented Nov. 4, 1941

2,261,917

UNITED STATES PATENT OFFICE 2,261,917

TREATMENT OF SUGAR BEARING MATERIALS

Ernest E. Pittman and Robert Roger Bottoms, Louisville, Ky., assignors to The Girdler Corporation, Louisville, Ky., a corporation of Delaware No Drawing. Application January 4, 1939, Serial No. 249,248

5 Claims. (Cl. 127—46)

As used herein the term sugar-bearing materials is intended to cover generically those juices, solutions and bodies, the main constituent of which is some form of disaccharide, and which have in conjunction therewith undesired non-sugar materials, such as ash, fiber, nitrogenous bodies, fats and waxes, pectin and gums, and various types of acids which it is necessary or desirable to remove.

Furthermore, the term "non-sugar materials" as used herein is intended to cover those ingredients which are normally either in solution or in the form of colloidal suspension, or otherwise are in any difficultly removable relation with respect to the sugar-bearing material.

An important object of the invention is to provide a method for increasing the recovery of sugar from a given amount of sugar-bearing material.

A further important object of the invention provides a method of treating sugar-bearing solutions by removing non-sugar materials at the beginning of the processing phases.

A further important object of the invention is to provide a process for simplifying the clarification and/or purification and/or decolorizing of sugar-containing solutions.

An important object of the invention is to provide new and relatively inexpensive methods and means for clarifying and/or purifying and/or decolorizing sugar-containing solutions.

Another object of the invention is to provide an improved method whereby refined sugar may be made at the conventional sugar house or sugar factory.

Another object of the invention is to provide a method for producing an improved grade of raw sugar.

Another object of the invention is to provide an improved method for the refining of raw sugar.

Another object of the invention is to provide a method for treating sugar-bearing materials which heretofore have been difficult to treat by known processes, as for example frozen canes and beets; canes and beets having low pH values; canes and beets grown in soils causing incorporation of difficulty removable non-sugar materials in the juices; canes which have been partly deteriorated by burning prior to harvesting; and canes and beets which have become deteriorated in storage, and canes of biological nature resulting in the inclusion of impurities heretofore found difficult to remove, as for example cane of the variety P. O. J. 2878.

Another object of the invention is to provide a method for treating sugar solutions in the manufacture of sirups, which will enable the operator to crush and macerate and more completely extract the sucrose from the cane, without regard to nitrogenous bodies included in the juices.

Another object of the invention is to provide a method for clarifying and/or purifying and/or decolorizing sugar-containing solutions, which is simpler and requires no delicate control or adjustments which would necessitate highly skilled attention.

A further object of the invention is to provide a process for reducing the quantity of relatively less valuable by-products of sugar manufacture.

A further object of the invention is to provide a process for manufacturing sugar, which requires less heat, less labor, less equipment, less time and less cost than present known methods of manufacture.

As another object, the invention provides a process which employs relatively inexpensive clarification agents, and in relatively small amounts.

As another object, the invention provides a process for manufacturing sugar and products allied with the sugar industry, whereby the problem of disposal of waste products may be eliminated or substantially reduced.

Another object of the invention is to provide a process for manufacturing sirup and/or molasses from widely varying qualities of cane or beets, or other sugar-containing materials.

An important object of the invention is to provide a new and improved sirup.

An important object of the invention is to provide a new and improved molasses.

A further object of the invention is to produce a raw sugar of a quality such that the affination step in the refining may be substantially reduced or eliminated.

A further object is to provide a sirup from which a superior grade of raw sugar may be obtained with less washing during the centrifuging of the sugar.

A further object of the invention is to provide a new and improved method of treating molasses.

A further object of the invention is to provide a new and improved method of recovering sugar and/or sirup and/or waxes from exhausted molasses.

Another object of the invention is to provide a process for removing non-sugar solids from sugar juices by means of a bentonite material.

An important object of the invention is to provide a process for removing color and color forming bodies from sugar-containing solutions by means of a bentonite material.

A further object of the invention is to provide a new and useful process for treating liquid effluents from various phases of sugar manufacturing processes.

An object of the invention is to provide a new process of defecation of sugar solutions.

An object of the invention is to improve the filterability of sugar juices.

Another object is to improve the evaporation characteristics of sugar juices.

A further object of the invention is to provide an improved molasses for use in certain fermentation industries.

Other objects and advantages will become more apparent as the description proceeds.

Heretofore in the manufacture of sugar, particularly from cane and beet sugar-bearing materials, much difficulty has been experienced in the removal of the non-sugars native to the cane or beet, and which carry over into the end products, and which adversely influence certain phases of manufacture, such as filtration, evaporation and crystallization.

In a typical sugar cane, non-sugars such as ash, fiber, nitrogenous bodies, fat and wax, pectin and gum, and various acids are usually found, while in a typical sugar beet juice, ash, pectin, proteins, fiber, acids and the like will also be found. The presence of materials of this nature exert undesired influences on the color of the sugar to be produced and the ability of the sugar to crystallize, and frequently results in the production of large quantities of the less valuable by-products of manufacture, such as molasses.

Usually an effort is made at substantially all points in the process of manufacture, to eliminate these undesired non-sugars, and in so doing it frequently happens that the usual treatment involving the use of lime also creates certain inherent problems which in themselves unfavorably influence the subsequent steps in the process of manufacture.

We have discovered that by the use of colloidal bentonite as an adsorbing agent for treating sugar-containing solutions, the industry will be able to remove undesirable non-sugars from the sugar-bearing materials at the threshold of the entire process of manufacture, whether it be for the purpose of making sugar, sirup, molasses or allied products. By thus removing undesirable non-sugars prior to further processing, a remarkable simplification of the later steps in the processing results. It is to be understood, however, that the invention is not to be limited to the use of a bentonite material at the initial stages only of processing, but that the bentonite treatment may be used either at the initial stage of processing or at subsequent stages, or at both the initial and subsequent stages.

The term bentonite as used herein is intended to cover various minerals either in a natural or treated condition, and known under various names, examples of which are listed in Technical Paper No. 438 of the Bureau of Mines, Department of Commerce of the U. S. Government, entitled "Bentonite" by Davis and Vacher. For the purposes of this invention, we may use any form of bentonite which is characterized by a sufficient amount of material which will disperse in water and form a relatively stable colloidal suspension.

With the foregoing in mind, the following process is disclosed as an illustrative example of the manufacture of sugar from sugar cane. Cane of any commercial variety and condition is crushed in the conventional type of mills, and the juices received from the mill may be led into a suitable storage vat. The juices after entering the storage vats are mixed with a quantity of bentonite, which preferably is in the form of a slurry which has been aged for a period of time, although with some types of bentonite aging is not necessary. In general, an amount of bentonite by weight of about $\frac{1}{10}$ of 1% of the weight of the soluble solids as determined by a hydrometer calibrated in a Brix scale or by other suitable methods, will usually suffice for our purposes, although it is to be expressly understood that this ratio is only by way of illustration, and not by way of limitation, as larger or smaller amounts may be employed depending upon the characteristics of the particular solution being treated. With a relatively high non-sugar content the amount of bentonite may approach 1%.

The bentonite not only tends to form quickly a coagulum with the soluble as well as the colloidal nitrogenous matter in the juices, but also appears to have an affinity for coloring matter such as chlorophyll, anthocyanin, saccharatin, water-soluble polyphenols, and tannin-like substances found in the juices, and also tends to react with certain elements found in the ash content of the juices.

Following the mixing of the juice and bentonite slurry, with or without heating and/or agitation, the mixture may be immediately directed into any suitable heating means in which its temperature may be raised to about 190° F., at which a coagulum forms in the juice. A longer time will be required if the temperature is substantially lower, and dispersion of the flocks of agglomerate may occur if there be a substantial amount of agitation, for instance resulting from continued boiling. Although the degree and time of heating does not appear to be critical with regard to the clarification, purification and decolorization of the juices, it is advisable to avoid too long a period of heating or too high a degree of heating, so as to avoid any substantial inversion loss.

The mixing and heating may be in batches, or separate pumps may continuously force the proper proportions of slurry and juice through mixing and heating elements.

After heating to the desired temperature, the juice and agglomerate may be separated in the heating chamber or in any suitable separating apparatus, as for example an inexpensive open tank, a Dorr clarifier or other continuous gravity separation apparatus, a filtering apparatus, a centrifuge or the like.

If a tank be used, the mixture may be heated to about 190° F., if the entering temperature was lower, or may be kept at about that temperature, and a comparatively thick scum or agglomerate will rise to the surface of the liquid. This is enhanced by the escape of air which was incorporated in the juice during the milling. Although the clarification appears to be complete in a very short period of time, the material should be held in the tank until separation of agglomerate and liquid is substantially complete, as indicated by visual inspection. Due to the adsorbing action of the bentonite on the non-sugar materials, the agglomerate will usually be of light green color, and will contain a coagulum having an exceptionally high percentage of the waxes and gums, and will also contain fine bits of bagasse, and certain entrained insoluble materials, including lime salts if the lime treatment be used as an adjunct to the process to adjust the pH. As the scum rises toward the top of the liquid bath, it tends to entrain and carry with it suspended solid particles and colloids which actually may be heavier than or about the same specific gravity as the juice. The same type of separation may be effected in various other types of separating apparatus, such as filters, centrifuges, etc.

After obtaining a suitable separation of agglomerate which includes the bentonite and adsorbed materials from the liquid, the clarified liquid may be subjected to any suitable additional treatment, such as with activated vegetable or animal charcoal or chemical decolorizing agents, followed by later separation which may employ sedimentation either by gravity or centrifugal action, prior to introduction into the evaporators. If such additional clarification is not deemed necessary, the clarified liquid from the separating means may be led directly into the evaporation stages of the process.

Since the light frothy agglomerate of scum contains a certain amount of juice together with the removed waxes and other non-sugars from the raw juices, this scum may be passed through a suitable separating means such as a filter for separate recovery of the non-sugars, and for the salvage of any additional juice which it may contain. Such salvaged liquid can then be added to the liquid going to the evaporators, or be separately treated, and the filter cake likewise can be separately treated for recovery of any particular ingredient which is desired, or may be taken to a conventional waste disposal point.

Although the process thus far described does not necessarily involve an adjustment of pH, it is to be understood that, if desired, the juices may likewise be subjected to any conventional liming, sulphitation, phosphoric acid, or any other types of treatment, in addition to the treatment with the bentonite material, and this treatment may take place prior to the bentonite treatment, simultaneously therewith or subsequent thereto. The clarified juices, with or without a pH adjustment, are led into the usual multi-stage evaporators, wherein they may be concentrated rapidly to a value of about 55° to 60° Brix.

As a result of the omission of substantial liming and other treatment, and as a result of the removal of non-sugar materials which heretofore have found their way into the evaporating and other stages of processing, it has become possible by our invention to increase substantially the evaporating capacity of a given apparatus, and as a result of the bentonite treatment of sugar-bearing solutions, it is possible to use less steam, concentrate more rapidly, and secure a better heat transfer in the apparatus.

Following the evaporation, the concentrated sirup may be led directly to the usual vacuum pan apparatus for crystallization, or if desired. as for example in the manufacture of direct consumption sugar, may be subjected to any suitable additional decolorizing process, as treatment with bone char. The concentrated sirup entering the vacuum pan can then be crystallized, and the resulting massecuite directed to the usual separating means such as a centrifuge.

In the centrifuge the sugar will be separated from the molasses and may then be led into a dryer or granulator in which the material will receive its final processing when direct consumption sugar is being made from the sugar juices. However, when it is desired to make only an improved grade of raw sugar, the drying step may be omitted.

From the centrifuge the mother liquor in the form of the first molasses may then be returned to a previous step of the process for further removal of sucrose. This recirculation of various grades of molasses may be continued until substantially all of the crystallizable sugar content thereof has been exhausted.

It is customary at the present time to assume that approximately 93% of the total amount of sucrose entering the process will be recovered as raw sugar. We now are able to recover an appreciably larger percentage.

The non-sugar materials, particularly those of nitrogenous character, have heretofore remained in the molasses due to inherent limitations of known processes of manufacture, but in our process these are removed, or greatly reduced in amount. As a result, it is now possible to secure more sugar from a given amount of sugar-bearing solution entering the manufacturing process than has been possible heretofore.

Because of the removal of melassigenic materials there is a smaller amount of molasses produced from a given amount of raw material entering; and as non-sugar constituents of molasses inhibit the crystallization of sugar from the molasses, the removal of such bodies permits more sucrose to crystallize. Therefore a greater recovery of commercial sugar is obtained than has heretofore been possible.

When it is desired to employ our invention in the refining of raw sugar, substantially the same process will be followed as above outlined. A washed raw sugar of 98% to 99% purity is melted to a sirup of about 60° Brix, the pH adjusted with lime or other alkaline agent, then treated with bentonite material, heated, and the agglomerate removed in any suitable separating equipment. As a result there is produced a clarified sugar solution which can be further decolorized by known means, concentrated in a vacuum pan, and delivered to the centrifuge and a dryer, from which a refined sugar having approximately 100° polarization will be obtained.

When it is desired to retreat molasses or sirups derived from the present liming and other types of sugar processing, the material may be diluted until the solution is about 30° Brix. The solution is then treated with a bentonite slurry, the impurities separated from the heated mixture, and the processing of the clarified material continued in the customary manner as above outlined with respect to other sugar-containing solutions. It becomes possible, therefore, to improve the appearance and increase the value of the molasses and remove valuable sugar from the less valuable molasses.

The final molasses by-product from any of the foregoing treatments of sugar-containing materials will consist largely of invert sugars, and this may be employed for any usual purposes, such as in the fermentation industries, certain usages such as sirup, and other applications wherein invert sugar is of commercial value.

A commercial advantage of our invention results from the fact that the bentonite material which we employ is of widespread availability, and is comparatively inexpensive, even after transportation charges to isolated points of use are considered. Moreover, the use of bentonite materials, even when employed in combination with other materials, as for example vegetable and other chars, lime, phosphoric acid, sulphur compounds and the like, for treating sugar solutions, will result in substantial savings to the user, in that much smaller quantities of the other materials will be necessary.

Another important advantage of commercial importance results from the fact that the action of bentonite upon non-sugar materials in the sugar solutions does not appear to be limited by any critical conditions, and therefore the employing of skilled attention and elaborate control means to insure sensitive processing conditions is not necessary.

It is found that the use of bentonite in sugar solutions greatly extends the practical operations of the sugar manufacturer, and even when used only in approximately optimum ratios with the juice it is possible to secure remarkable clarifying, purifying and decolorizing of the sugar solutions, and at the same time it is possible to treat sugar-bearing materials which heretofore could not be successfully treated by known processes. As an example, deteriorated canes and beets, and those grown in soils which cause the incorporation of troublesome non-sugar materials heretofore difficult to remove, and canes and beets of biological nature which heretofore have been difficult to treat, may all be handled successfully by means of the present process.

Of particular importance is the fact that this invention may be applied to the manufacture of sugar cane sirup or sirups derived from other sugar-bearing materials, and to produce a sirup having distinctive, desirable characteristics, and having a reduced content of those nitrogenous bodies which heretofore have appeared in the final sirup product, and which have brought about certain limitations in the manufacturing of the sirup.

Likewise the invention may be employed in the manufacture of a final molasses product which has distinctive desirable characteristics, and which will be more valuable as an article of commerce than is the exhausted molasses of present practices.

It is to be expressly understood that the invention is not to be limited in any manner to the use in connection with sugar cane, but may be equally valuable in the treatment of sugar beets and other sugar-bearing materials such as sorghum, maple sap, and other materials of various origins containing disaccharides as the main or essential constituent, to remove nitrogenous and other undesirable ingredients.

When used in connection with the treatment of sugar beets the customary preliminary treatment of the beets may be followed, and the diffusion juice may then be treated before or after heating with a bentonite slurry, in order to agglomerate undesirable non-sugar materials. The agglomerate is then removed in any suitable manner, and the heated clarified beet juice from which non-sugar materials have been removed may receive any other desired treatment such as with lime, $CO_2$, $SO_2$, and the like, followed by filtration, sedimentation, or the like, if such an intermediate treatment is desired. The clarified juice thereafter passes through the later stages of operation, such as evaporation, followed by a second clarification or bleaching treatment if desired by the operator, and thereafter is directed as a thick juice into the usual vacuum pans and through the usual centrifuge. The best sugar recovered from the centrifuge may then be dried and packaged in the customary way, and will form the beet sugar of commerce.

Residual molasses or green liquor and washings coming from the centrifuge may be recirculated through the processing system in any desired manner, and substantially all of the crystallizable sugar will be recovered therefrom.

In contrast with the present day practice wherein exhausted molasses coming from the centrifuge contains large quantities of unrecovered sugar, necessitating a treatment such as the Steffen treatment, the molasses coming from our process is clearer and less viscous, and may be used as raw material for the fermentation industries, or it may be treated by the Steffen process in which the molasses may be processed to better advantage, due to the fact that non-sugar materials have been removed.

The invention may also be used in connection with the treatment of the usual beet sugar molasses now derived from the present alkaline earth oxide treatment, and which is customarily treated by the Steffen process for additional recovery of beet sugar. In this case we may dilute the usual beet sugar molasses and remove the non-sugar materials therefrom by use of the bentonite material. The molasses from which the non-sugar materials have been removed may then be processed to better advantage in the Steffen process or in a desired manner, to recover the crystallizable sugar content therefrom.

As another advantage, it is now possible to reduce the quantity and entirely change the character of the end waste products of sugar manufacture, and this brings about a great reduction in the problem of disposal of those end products, which heretofore has confronted the industry.

In the manufacture of cane or sorghum sirup, it is now possible for the manufacturer to produce a superior grade of bagasse and materials derived from bagasse. The milling operation may now be continued as far as desired and non-sugars derived from later stages of crushing may be eliminated with bentonite. Therefore, a drier, comminuted bagasse material of a superior type for fuel or raw material for the manufacture of wall boards, insulating material and the like, may now be commercially produced in connection with the manufacturing of sirup.

We are also able to secure from the defecation residues resulting from the bentonite treatment of the sugar cane, sorghum, beets and the like, certain valuable by-products which heretofore could not be recovered except at prohibitive cost. For example, we are now able to recover from the defecation residues isolated through the bentonite treatment, certain new and improved wax products, certain new and improved pectin products, and certain new and improved gum products, and other dispersoids.

As a result of the action of bentonite on coloring matter such as chlorophyll, anthocyanin, saccharetin, water-soluble polyphenols and tannin-like compounds, the problem of decolorizing the sugar materials is greatly reduced. Many of these materials tend to form color after or during the usual processing of sugar-bearing materials, and by the removal of suspended as well as soluble color and color-forming materials, we are able to insure a definite stability of color in the final product.

Another advantage derived from the bentonite treatment is that waste effluents from sugar manufacture establishments may be purified by the use of bentonite material, and materials of organic nature which tend to collect in the waste effluent from the several phases of manufacture can be successfully removed therefrom, and the sanitary condition of the effluent improved.

As will be apparent, the treatment of sugar-bearing materials to remove non-sugars at the threshold of the manufacturing operations, brings about many improvements in later stages of conventional treatment of those materials. There is obtained a juice with lower viscosity, of enhanced filterability as it removes colloidal material which tends to clog the filters, and reduces the amount of filter aids required. It also results in a more satisfactory operation in the evaporator, better rate of heat transfer, less scaling or fouling of the heat transfer surfaces, less entrainment, and less trouble from entrainment. As the sirup and molasses have lower viscosity, there is obtained an increased rate of crystallization and a saving in equipment and labor.

As will become more apparent to those skilled in the art, the invention has manifold other advantages and merits, and it will be understood that the foregoing disclosure of the same is intended merely by way of illustration, and not by way of limitation as to the scope of our invention.

Having thus described our invention, what we claim as new and desire to secure by Letters Patent is:

1. The process of defecating a sugar-bearing solution containing a sufficient quantity of non-sugars to coagulate a stable suspension of colloidal bentonite, which consists in mixing colloidal bentonite capable of dispersion in water and forming a relatively stable colloidal suspension therein with said solution to form a coagulum of the bentonite and non-sugar ingredients of the solution, and separating the coagulum from the sugar solution.

2. The process of defecating a sugar-bearing solution containing a sufficient quantity of non-sugars to coagulate a stable suspension of colloidal bentonite, which consists in mixing colloidal bentonite capable of dispersion in water and forming a relatively stable colloidal suspension therein with said solution to form an agglomerated coagulum of the bentonite and non-sugar ingredients of the solution, flocculating by the action of heat, and separating the flocculated matter from the sugar solution.

3. The process of defecating a sugar-bearing solution containing a sufficient quantity of non-sugars to coagulate a stable suspension of colloidal bentonite, which consists in mixing colloidal bentonite capable of dispersion in water and forming a relatively stable colloidal suspension therein with said solution to form an agglomerate of the bentonite and non-sugar ingredients of the solution, heating the mixture in the range of about 180° F. to 210° F. to cause flocculation, and separating the flocculated matter from the sugar solution.

4. The process of defecating a sugar-bearing solution containing a sufficient quantity of non-sugars to coagulate a stable suspension of colloidal bentonite, which consists in mixing colloidal bentonite capable of dispersion in water and forming a relatively stable colloidal suspension therein with said solution to form an agglomerate of the bentonite and non-sugar ingredients of the solution, the amount of bentonite being equal to about $\frac{1}{10}$ of 1% of the soluble solids of the solution, and separating the agglomerate from the sugar solution.

5. The process of defecating sugar-bearing juices of cane or sorghum containing a sufficient quantity of non-sugars to coagulate a stable suspension of colloidal bentonite, which consists in mixing colloidal bentonite capable of dispersion in water and forming a relatively stable colloidal suspension therein with said solution to form an agglomerated coagulum of the bentonite and non-sugar ingredients of the solution, maintaining the mixture at a temperature of about 190° F. for a short time to effect flocculation, whereby the coagulum rises to the top as a scum, and separating the scum and clarified solution.

ERNEST E. PITTMAN.
ROBERT ROGER BOTTOMS.